United States Patent [19]
Sasaki et al.

[11] 4,101,171
[45] Jul. 18, 1978

[54] TONGUE PLATE FOR SEAT BELT DEVICE

[75] Inventors: Shiro Sasaki, Toyota; Mitsuo Inukai, Nagoya, both of Japan

[73] Assignees: Toyota Jidosha Kogyo Kabushiki Kaisha, Tokai Rika Denki Seisakusho K.K., both of Japan

[21] Appl. No.: 810,682

[22] Filed: Jun. 27, 1977

[30] Foreign Application Priority Data

Jul. 31, 1976 [JP] Japan ............................ 51-103071[U]

[51] Int. Cl.² .............................................. A62B 35/00
[52] U.S. Cl. ...................................................... 297/389
[58] Field of Search ................................ 297/389, 388; 24/265 AL, 149; 280/747, 744

[56] References Cited

U.S. PATENT DOCUMENTS

| 3,258,293 | 6/1966 | Sharp | 297/389 |
| 3,981,052 | 9/1976 | Pilarski | 297/389 |

FOREIGN PATENT DOCUMENTS

| 2,401,578 | 7/1974 | Fed. Rep. of Germany | 297/389 |
| 2,233,856 | 1/1974 | Fed. Rep. of Germany | 297/389 |

Primary Examiner—James T. McCall
Attorney, Agent, or Firm—Stevens, Davis, Miller & Mosher

[57] ABSTRACT

A tongue plate for a seat belt device in which a roller is rotatably provided in a slot in a tongue plate through which a seat belt webbing passes so that the seat belt does not press or tighten the passenger's body, when the passenger moves his body while wearing the seat belt.

10 Claims, 5 Drawing Figures

TONGUE PLATE FOR SEAT BELT DEVICE

The present invention is primarily related to an improvement on a tongue plate such as a slip-through tongue plate for use in a three-point type seat belt device.

An object of the present invention is to provide such a tongue plate for a seat belt having a more comfortable feeling and to insure greater safety. The above object can be achieved by providing at the peripheral side of the slot in the tongue plate through which the seat belt webbing passes an arrangement in which the webbing is kept in contact in a manner of rolling friction with a part of said peripheral side where said webbing is wound and turned back so that, when the passenger moves his body with the seat belt fastened, the seat belt can slip lightly and smoothly through the slot of the tongue plate in accordance with the movement of this body, while, when the passenger takes his normal sitting position again, the seat belt can slip back also lightly and smoothly through the slot to its normal securing position.

The aforementioned and other objects and features of the present invention will be obvious from the following detailed description of the invention taken with reference to the accompanying drawings, in which.

Figure 1:
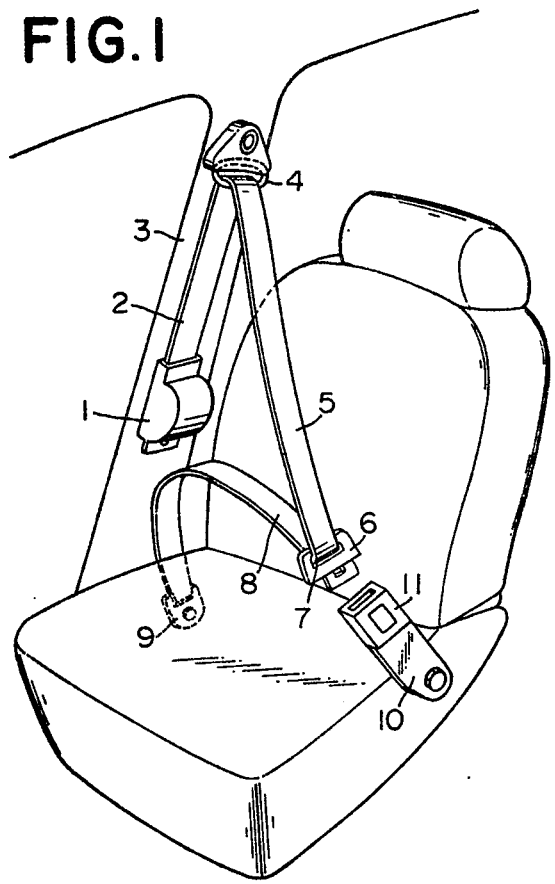
FIG. 1 is a schematic perspective view of a preferred embodiment of the seat belt device using the tongue plate device according to the present invention.

Referring now to FIG. 1, the seat belt webbing 2 pulled out from the retractor 1 is turned back at the slip joint 4 secured to the center pillar 3 of the car body to form a shoulder belt portion 5 and, then, the webbing 2 further passes the slot 7 formed in the tongue plate 6 according to the present invention to be again turned back thereat and forms a lap belt portion 8 which is secured to a fixture 9 on the car floor. The afore-mentioned tongue plate 6 is arranged so as to be engaged with a buckle 11 of a fixture 10 on the opposite side of said fixture 9.

In the three-point type seat belt device as shown in FIG. 1, when the passenger wearing the seat belt raises his body to look backward over his shoulder, the seat belt webbing 2 slips through the slot 7 of the tongue plate 6, and the shoulder belt portion 5 shifts to the side of lap belt portion 8. In such a case, if there is a high frictional resistance between the tongue plate 6 and the seat belt webbing 2, relatively large effort is required for the passenger to raise his body. On the other hand, if an excessively high frictional resistance exists between the tongue plate 6 and the seat belt webbing 2, the shoulder belt portion 5 cannot be shifted smoothly to the lap belt portion side 8 when the body of the passenger is lifted due to violent jolting of the car body as encountered in travelling on a rough road and, as a result, the lap belt 8 heavily presses the passenger's belly, thus giving the passenger a very uncomfortable fit. In the meantime, if the passenger wearing the seat belt raises his body to open or close the car door, the lap belt portion 8 will be slackened and remain slackened thereafter, because the elastic retractive force is not transmitted to the lap belt portion side from the retractor 1 due to such an excessively high frictional resistance existing between the tongue plate 6 and the seat belt webbing 2 and, therefore, the passenger is not securely held, resulting in an incomplete protection of the passenger against possible accidents such as collision.

Figure 5:
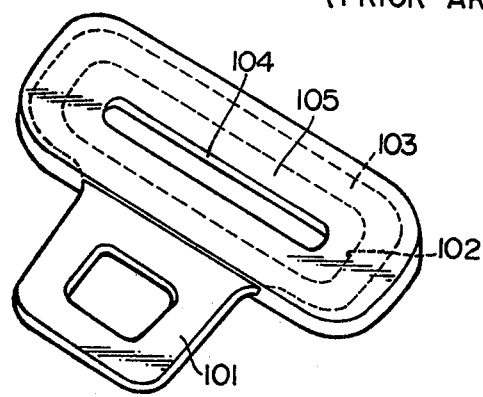
FIG. 5 is a perspective view of a conventional tongue plate.

In general, to minimize the aforementioned frictional resistance and to prevent the abrasion of the seat belt webbing 2, a conventional tongue plate as shown in FIG. 5 has been proposed, said tongue plate comprising a base plate constructed of a metal plate in which a buckle insert portion 101 is formed integrally with a main frame portion 103 of said base plate having a slot 102 for passing a seat belt webbing of the seat belt device, and an outer peripheral surface of the main frame 103 is coated with a layer of synthetic resin having a low frictional resistance such as nylon. However, even with such a construction as described above, the peripheral side 105 of the slot 104 coated with said synthetic resin film layer which is in contact with the seat belt webbing presents a high frictional resistance to the seat belt webbing, thus bringing about the aforementioned shortcomings of the seat belt device.

Figure 2:
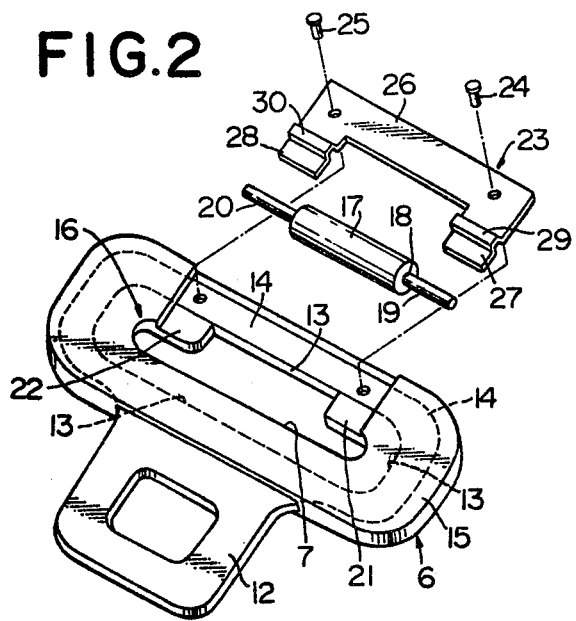
FIG. 2 is an exploded perspective view of a preferred embodiment of the tongue plate according to the present invention.
Figure 3:
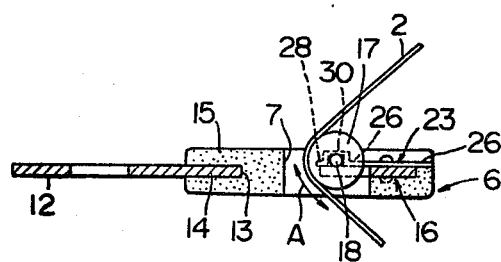
FIG. 3 is a longitudinal section of the tongue plate shown in FIG. 2.

As shown in FIGS. 2 and 3, the tongue plate according to the present invention comprises a base plate constructed of a metal plate in which a buckle insert portion 12 and a main frame portion 14 having a slot 13 for the seat belt webbing 2 are integrally formed, and the outer periphery of the main frame portion 14 is coated with a layer of synthetic resin 15 such as nylon. At the peripheral side 16 of the slot 7 for the seat belt webbing 2 on the opposite side of the buckle insert portion 12, the seat belt webbing 2 is in contact with the tongue plate and turned back in the manner as shown in FIG. 1.

At said peripheral side 16, one of the synthetic resin layers 15 on the upper and lower sides of the base plate, namely the upper layer in the illustrated example, is peeled off to the brink of the main frame portion 14 of the base plate. Also, the synthetic resin layer on the peripheral side 16 of the slot 7 which is to be in contact with the webbing 2 is peeled off to the brink of the side edge of the slot 13 of the main frame portion 14, and a recess is formed at the latter peeled-off portion of the peripheral side for mounting a roller 17.

Said roller 17 is freely rotatably fitted onto a shaft 18 which has end portions 19 and 20 of angular section to be seated on flat portions 21 and 22 formed by peeling off the synthetic resin layer as shown in FIGS. 2 and 3.

Also, as shown in FIGS. 2 and 3, the end portions 19 and 20 of the shaft 18 are carried by a holding plate 23 of metal so that the shaft 18 is not dislocated and dropped out of position.

This holding plate 23 is seated on the exposed recess of the main frame 14 for the mounting of the roller 17. Said holding plate 23 is composed of a fixing plate portion 26 to be secured to the main frame by securing members 24 and 25 such as rivets and bearing member portions 27 and 28 extended sideward from the ends of the base plate portion 26. The groove member portions 27 and 28 are formed with groove portions 29 and 30 of angular shape which is closely fitted onto the shaft end portions 19 and 20 of angular shape so that the shaft 18 can be fixed in place to a predetermined position as shown in FIG. 2. According to the aforementioned construction of the tongue plate, the seat belt webbing 2 passing through the slot 7 and in contact with the roller 17 to be turned back thereat can be moved lightly and smoothly in the direction indicated by an arrow A on account of the rotation of the roller 17, as shown in FIG. 3.

Figure 4:
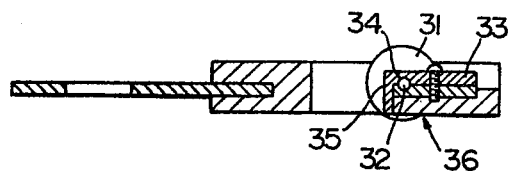
FIG. 4 is a longitudinal section of another preferred embodiment of the tongue plate according to the present invention.

In another embodiment of the tongue plate according to the present invention as shown in FIG. 4, a rotatable shaft having end portions 32 of round section is secured to a roller 31. The end portions 32 of the rotatable shaft is freely rotatably held by groove portions 34 of round section of an L-shaped holding plate 33. While, end plate portions 35 bent in a manner to form the L-shape function to prevent the shaft end portions 32 from being dislocated and to reinforce the overall strength of a peripheral side 36 where the seat belt webbing is in contact and turned back.

As fully described hereinbefore, according to the tongue plate of the present invention, the roller is freely rotatably provided at the peripheral side of the base plate to be in contact with the seat belt webbing in such a manner that the roller faces the slot for the seat belt webbing and internally contacts the portion of the seat belt webbing where the belt is turned back, thereby keeping the webbing in contact with the tongue plate in a substantially complete rolling frictional manner. Thus, according to the present invention, the seat belt webbing can be shifted remarkably smoothly so that, when the passenger moves his body, the seat belt webbing is also moved substantially freely in accordance with the movement of the passenger and, then, moved smoothly back to its normal wearing position. Therefore, the comfort level is remarkably improved in that the seat belt webbing neither excessively presses and tightens the body of the passenger, nor remains slackened after the passenger has taken his normal position. Thus, the passenger can always maintain the proper fastening condition of the seat belt and can enjoy a substantially perfect protection against probable accidents.

Further, according to the tongue plate of the present invention in which the shaft of the roller is held by the groove portions between the peripheral side of the slot where the seat belt webbing is in contact and the holding plate of metal, a base plate of relatively simple and rigid construction can be used.

What we claim is:

1. A tongue plate for a seat belt device comprising;
   a base plate constructed of a metal plate in which a buckle insert portion is formed integrally with a main frame portion of said base plate having a slot for passing a seat belt webbing of the seat belt device, and
   a rotatable roller having a supporting shaft disposed in the face of the slot in the main frame portion at a peripheral side of the slot opposite to the buckle insert, where said seat belt webbing is in contact;
   an outer peripheral surface of the main frame portion and end portions of said supporting shaft coated with a layer of synthetic resin having suitable thickness, said supporting shaft of said rotatable roller being carried by said layer of synthetic resin.

2. A tongue plate for a seat belt device comprising;
   a base plate constructed of a metal plate in which a buckle insert portion is formed integrally with a main frame portion of said base plate having a slot for passing a seat belt webbing of the seat belt device,
   a rotatable roller having a supporting shaft disposed in the face of the slot in the main frame portion at a peripheral side of the slot opposite to the buckle insert, where said seat belt webbing is in contact, and
   a holding plate of metal secured onto the peripheral side of the slot in the main frame portion, having bearing portions formed between said holding plate and the peripheral side of the slot;
   said supporting shaft of said rotatable roller being carried by the bearing portions.

3. A tongue plate for a seat belt device according to a claim 2, wherein an outer peripheral surface of the main frame portion is coated with a layer of synthetic resin having a suitable thickness.

4. A tongue plate for a seat belt device according to a claim 3, wherein said layer of synthetic resin is peeled off at portions where said holding plate is secured and where said rotatable roller is disposed.

5. A tongue plate for a seat belt device according to a claim 2, wherein said holding plate comprises a fixing plate portion to be secured to the main frame portion and the bearing member portions extend sideward from the ends of the fixing plate portion, said bearing member portions being formed with groove portions, respectively, into which said supporting shaft of said rotatable roller is fitted.

6. A tongue plate for a seat belt device according to a claim 2, wherein the bearing portions comprise groove portions and the synthetic resin layer coated on the peripheral side of the slot in said main frame portion where the seat belt webbing contacts it.

7. A tongue plate for a seat belt device according to a claim 1, wherein said rotatable roller is freely rotatably supported on said supporting shaft.

8. A tongue plate for a seat belt device according to a claim 5, wherein the end portions of said supporting shaft are formed in an angular shape in section thereof and said groove portions are formed in an angular section similar to the end portions of said supporting shaft.

9. A tongue plate for a seat belt device according to claim 1, wherein said rotatable roller is secured to said supporting shaft having the end portions thereof formed in a round shape in section.

10. A tongue plate for a seat belt device according to claim 5, wherein the bearing member portions are formed in an L-shape.

* * * * *